United States Patent [19]
Wilcher

[11] Patent Number: 5,918,730
[45] Date of Patent: Jul. 6, 1999

[54] SLUDGE COLLECTOR CHAIN WITH SNAP-LOCK PINS

[75] Inventor: Stephen B. Wilcher, Harleysville, Pa.

[73] Assignee: U.S. Filter Wastewater Group, Inc., Palm Desert, Calif.

[21] Appl. No.: 08/901,029

[22] Filed: Jul. 25, 1997

[51] Int. Cl.[6] .................................................. B65G 17/06
[52] U.S. Cl. ........................ 198/851; 198/733; 474/223
[58] Field of Search .................................. 198/850, 851, 198/853, 728, 731, 733, 717, 725; 474/223, 228

[56] References Cited

U.S. PATENT DOCUMENTS

| | | |
|---|---|---|
| 1,754,209 | 4/1930 | Carr . |
| 1,760,266 | 5/1930 | Carr . |
| 2,589,355 | 3/1952 | Faber ........................................ 74/254 |
| 3,278,000 | 10/1966 | I'anson .................................... 198/850 |
| 4,123,947 | 11/1978 | Smith ........................................ 74/245 |
| 4,271,663 | 6/1981 | Templin et al. ............................ 59/84 |
| 4,353,459 | 10/1982 | Petershack .............................. 198/852 |
| 4,355,502 | 10/1982 | Sheldon ..................................... 59/84 |
| 4,563,168 | 1/1986 | Schneider ................................ 474/207 |
| 4,682,687 | 7/1987 | Leege et al. ............................ 198/852 |
| 4,744,211 | 5/1988 | Abe ............................................ 59/85 |
| 4,858,753 | 8/1989 | Hodlesky ................................. 198/853 |
| 4,863,418 | 9/1989 | Fillar et al. ............................. 474/207 |
| 4,932,927 | 6/1990 | Fillar ........................................ 474/207 |
| 5,092,118 | 3/1992 | Van DeMark .............................. 59/84 |
| 5,165,522 | 11/1992 | Uttke et al. ............................. 198/716 |
| 5,215,616 | 6/1993 | Fillar ....................................... 156/173 |
| 5,337,886 | 8/1994 | Anderson et al. ....................... 198/728 |
| 5,461,852 | 10/1995 | Nagamatsu ................................. 59/84 |

FOREIGN PATENT DOCUMENTS 792578  4/1985  United Kingdom .

OTHER PUBLICATIONS

FMC Corporation. *"Straightline Collector "Non–Metallic" Components"*, Bulletin No. 16200. Dated Dec. 1990, Printed in USA.

FMC Corporation. "Straightline Sludge Collectors" Bulletin No. 16000 Dated Sep. 1994. Printed in USA.

Link–Belt/FMC. "C Class Combination Chains and 700 Class Pintle Chains" Product Brochure. Not Dated.

Envirex."Rex Loop Chain" Bulletin No. 315–97. Dated 1986, Waukesha, WI.

National Hydro Systems Inc. "NCS–720–S Corrosion Resistant Plastic Chain" Information Specification Sheet. Dated Nov. 10, 1986.

Finnchain. "NLC–System Sludge Collector for Sedimentation Tanks" Dated Feb. 1997, Finland.

GlasForms Inc. "Composite Loop Chain Designed for Extended Life in Conveyor Sludge Collectors" Product Description. Not Dated. San Jose, CA.

(List continued on next page.)

*Primary Examiner*—James R. Bidwell
*Attorney, Agent, or Firm*—Michael, Best & Friedrich

[57] ABSTRACT

There is provided a non-metallic sludge collector chain comprising at least one center block link comprising a first bore at a first end of the center block link and a second bore at a second end of the center block link, at least one insert sidebar comprising a first bore at a first end of the insert sidebar and a second bore at a second end of the insert sidebar, at least one receiving sidebar comprising a first bore at a first end of the receiving sidebar and a second bore at a second end of the receiving sidebar, a pin comprising a first end portion, a second end portion, and a central portion disposed between the first and second end portions, the second end portion having a grooved section, the pin being positioned through the first bore of the insert sidebar, through the first bore of the center block link, and through the first bore the receiving sidebar, and a pin cap comprising a sleeve having a raised ring protuberance thereon, the raised ring protuberance being in snapped-fit relation to the grooved section of the pin. There is also provided an alternate embodiment further incorporating an offset coupler link.

16 Claims, 4 Drawing Sheets

OTHER PUBLICATIONS

Budd Polychem Division. "Non–Metallic Rectangular Clarifier Components for Wastewater Treatment Applications". Product Brochure. Not Dated.

Jeffrey–Tropodyne. "Non–Metallic Collector Chain" Product Brochure Not Dated. Yonkers, NY.

Jeffrey Chain Corporation. "Non–Metallic Chains" Product Brochure Not Dated. Morristown, TN.

NRG. "Poly–Links Your Link to the Future" Product Brochure Not Dated. Ardmore, PA 19003.

Hitachi Maxco, Ltd. "NM–720S Non–Metallic Collector Chain" Product Bulletin Not Dated. Kennesaw, GA.

Rexnord Canada Ltd. "Rex Chains–The Proven Non–Metallic Chain for Sludge Collector Service" Bulletin No. 315–93. Envirex Inc. 1982, Waukesha, WI.

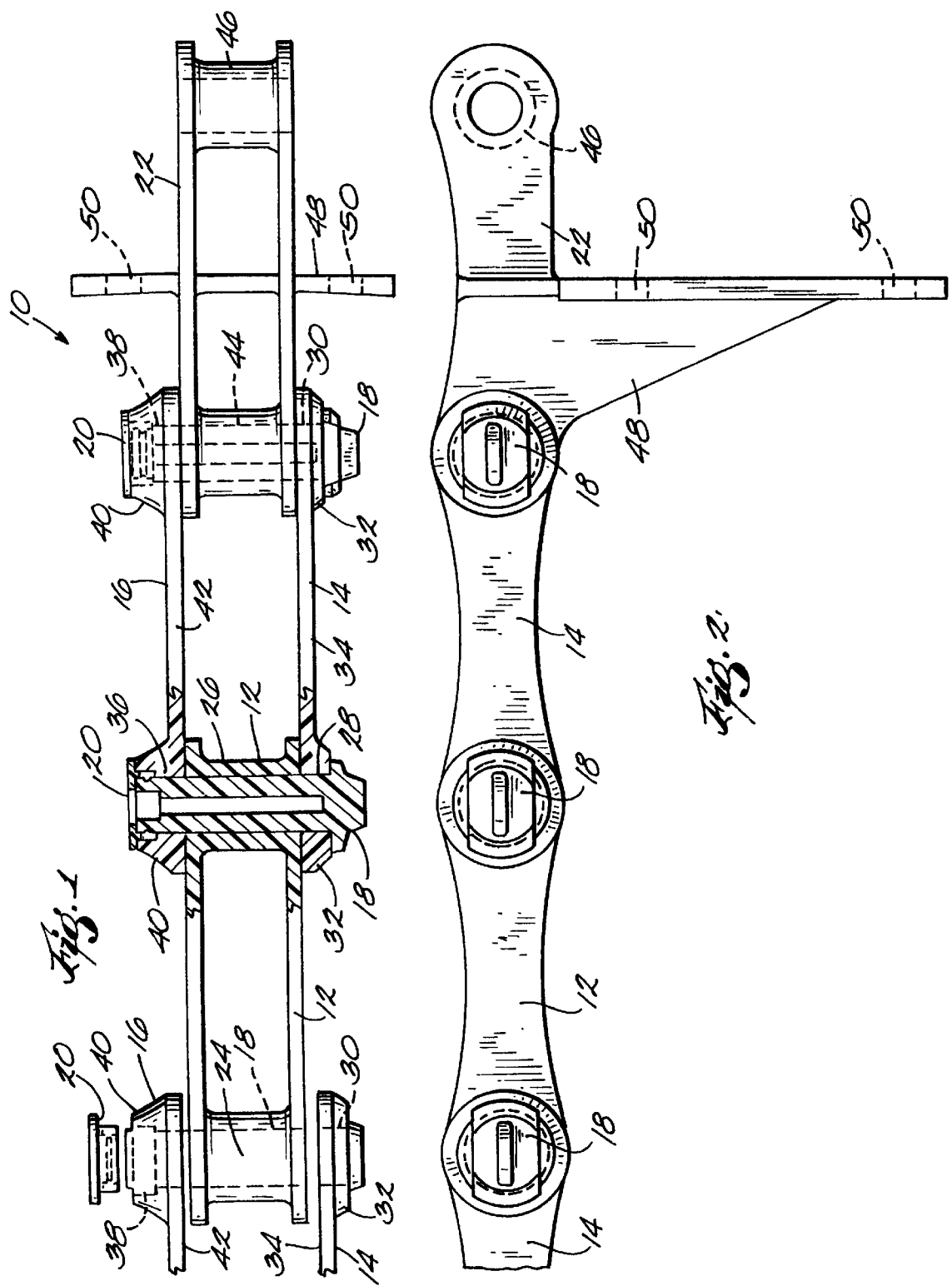

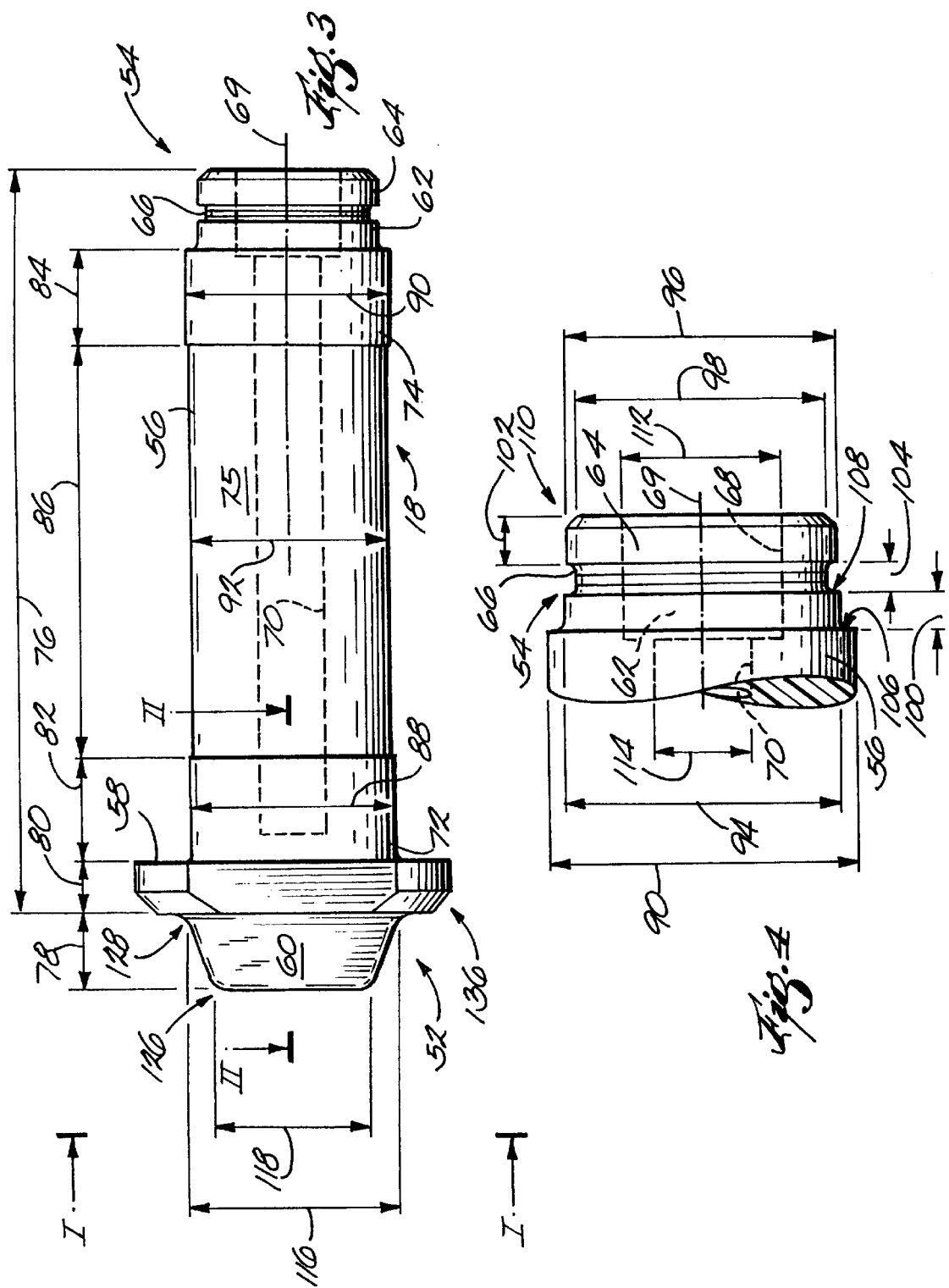

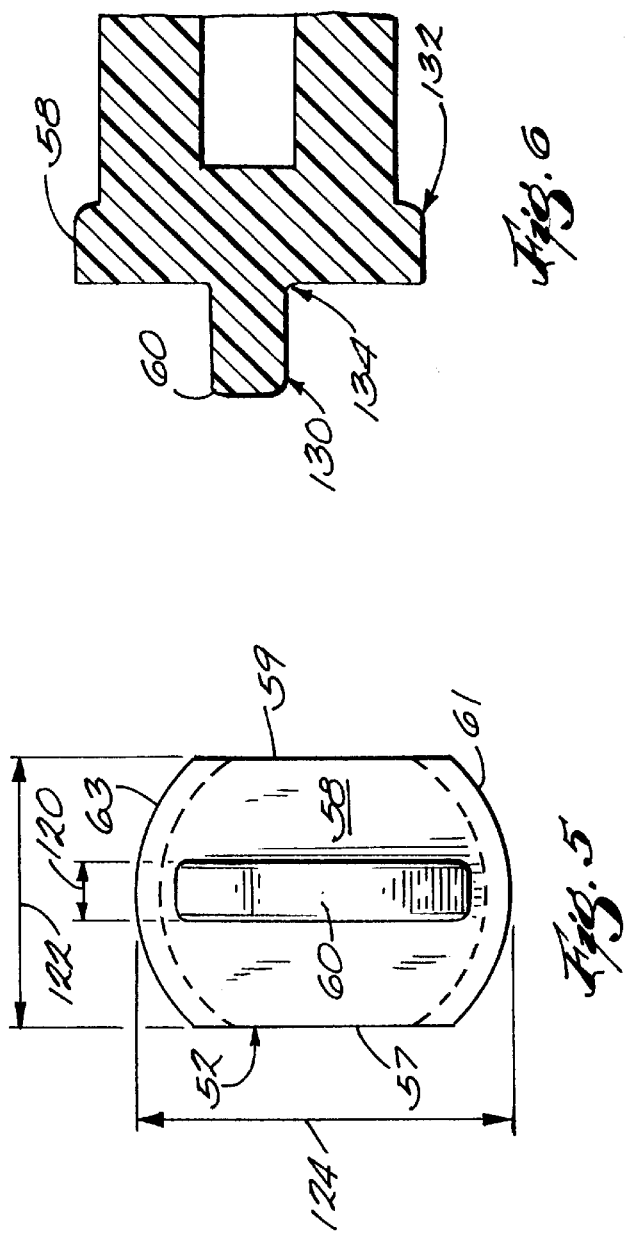

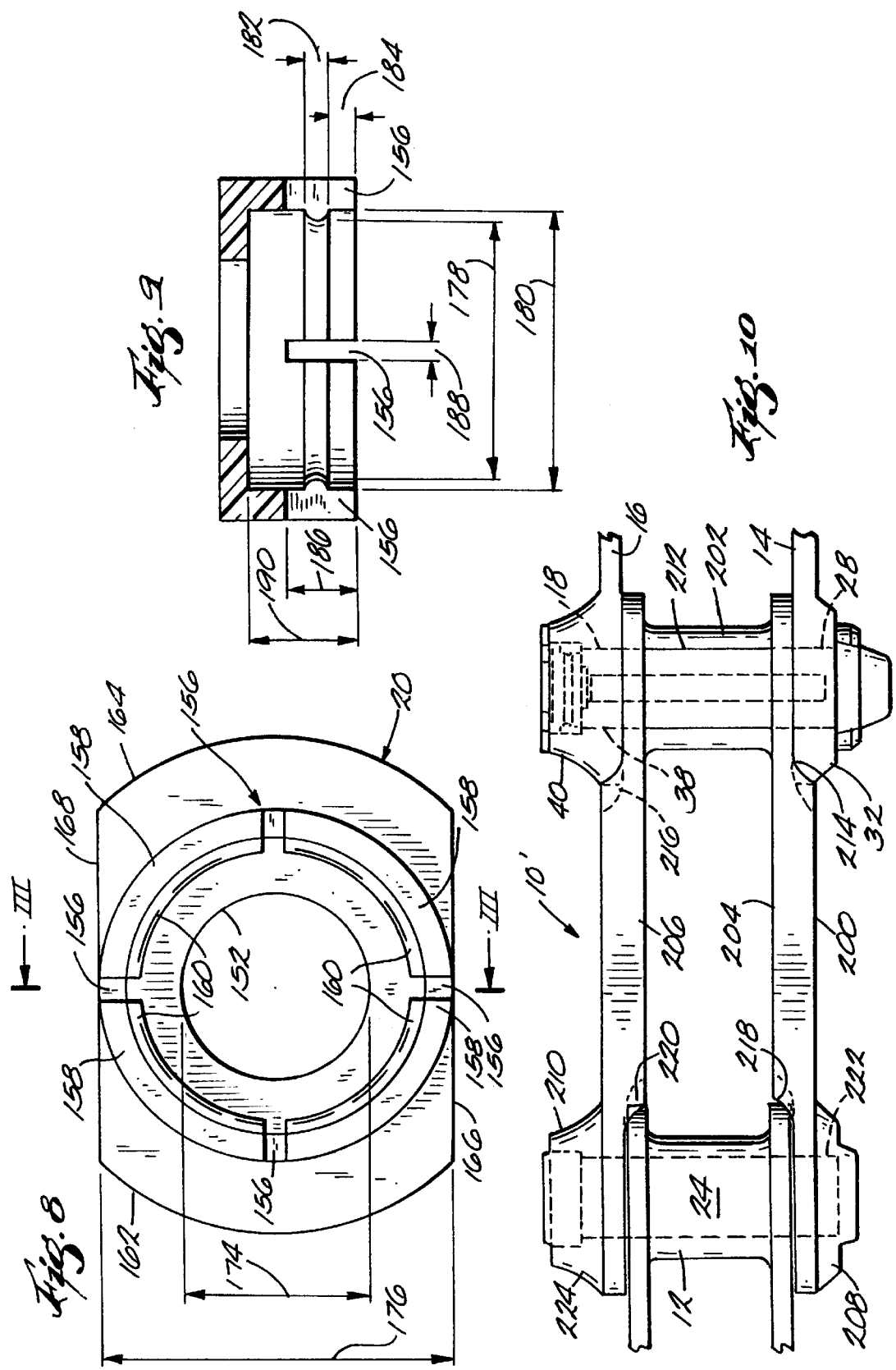

SLUDGE COLLECTOR CHAIN WITH SNAP-LOCK PINS

BACKGROUND OF THE INVENTION

1. Field of the Invention

This invention relates to chains and more particularly to sludge collector chains having snap-lock pins.

2. Description of Related Art

Sludge collectors are commonly used in wastewater treatment plants to scrape the settled sludge from the bottom of the settling tank and also to skim floating waste off the surface of the wastewater. These sludge collectors typically include a number of sludge flights, which are usually elongated members that extend the width of the tank. The ends of the flights are connected to conveyor chains which carry the flights in a circuit lengthwise along the bottom of the tank and back over the surface of the water to perform the scraping and skimming functions. The tanks are typically made of concrete and have supporting shafts with bearings and locking collars which support the transmission sprockets. The transmission sprockets, in turn, power the conveyor chain and flight systems.

These systems have been supplied for over seventy five years. The chains utilized in the systems up until the late 1970's were typically either cast steel, cast iron, malleable iron, welded steel, ductile iron, or other metallic materials. As a result, these chains were rather heavy, weighing up to seven pounds per foot. They were also subject to very high corrosion rates when taken out of service or exposed to the atmosphere after having been submerged in wastewater or water treatment basins. Due to weight, they may become extremely difficult to handle and maintain, generally requiring teams of maintenance personnel and portable cranes.

In the 1970's, non-metallic chains were introduced into the wastewater industry. They were readily accepted as they weigh approximately one-fifth that of the previous metallic chains, but the ultimate strengths of the product are approximately one-tenth to one-fifteenth that of the metal chains. Although applications can be limited, municipalities or end users have continued to specify them because the drive units required to drive the systems have much lower horsepower requirements due to the significantly lower weight and, therefore, have much lower power demands, even though the strength issue may eliminate certain applications. The ease of maintenance, however, is the primary reason non-metallic chains dominate the wastewater industry.

It is desirable to have a non-metallic conveyor chain which exhibits good strength characteristics, is lightweight, and is relatively easy to assemble. It is further desirable to have a non-metallic conveyor chain design which is able to isolate the wearing parts of the chain assembly for future replacement of the wearing parts only so as to not require complete chain replacement.

SUMMARY OF THE INVENTION

There is provided a sludge collector chain comprising at least one center block link comprising a first bore at a first end of the center block link and a second bore at a second end of the center block link, at least one insert sidebar comprising a first bore at a first end of the insert sidebar and a second bore at a second end of the insert sidebar, at least one receiving sidebar comprising a first bore at a first end of the receiving sidebar and a second bore at a second end of the receiving sidebar, a pin comprising a first end portion, a second end portion, and a central portion disposed between the first and second end portions, the second end portion having a grooved section, the pin being positioned through the first bore of the insert sidebar, through the first bore of the center block link, and through the first bore the receiving sidebar, and a pin cap comprising a sleeve having a raised ring protuberance thereon, the raised ring protuberance being in snapped-fit relation to the grooved section of the pin.

There is further provided a sludge collector chain comprising at least one center block link comprising a first bore at a first end of the center block link and a second bore at a second end of the center block link, at least one insert sidebar comprising a first bore at a first end of the insert sidebar and a second bore at a second end of the insert sidebar, at least one receiving sidebar comprising a first bore at a first end of the receiving sidebar and a second bore at a second end of the receiving sidebar, at least one offset coupler link comprising a waist, two legs extending from the waist, and two feet extending from the two legs, the offset coupler link further comprising a first bore in the waist and a second bore extending through both of the two feet, the offset coupler link being disposed between the at least one center block link and both of the at least one insert sidebar and the at least one receiving sidebar, at least two pins, each of the pins comprising a first end portion, a second end portion, and a central portion disposed between the first and second end portions, the second end portion having a grooved section, a first pin being positioned through the first bore of the center block link and through the second bore in the offset coupler link extending through both of the two feet and a second pin being positioned through the first bore in the offset coupler, through the first bore in the insert sidebar, and through the first bore of the receiving sidebar, and at least two pin caps, each of the pin caps comprising a sleeve having a raised ring protuberance thereon, the raised ring protuberance of each of the pin caps being in snapped-fit relation to each of the grooved sections of the pin.

BRIEF DESCRIPTION OF THE DRAWINGS

FIG. 1 is a plan view of a first embodiment of a sludge collector chain assembly of the present invention.

FIG. 2 is a side elevation view of the sludge collector chain shown in FIG. 1.

FIG. 3 is a plan view of the pin of the present invention.

FIG. 4 is an enlarged end view of the pin shown in FIG. 3.

FIG. 5 is an end view of the pin taken along the lines I—I of FIG. 3.

FIG. 6 is a cross-sectional view of the pin taken along the lines II—II of FIG. 3.

FIG. 7 is a side elevation view of the pin cap of the present invention.

FIG. 8 is an inside elevation view of the pin cap of FIG. 7.

FIG. 9 is a cross sectional view of the pin cap taken along the lines of III—III of FIG. 8.

FIG. 10 is a plan view of an alternate embodiment for a sludge collector chain of the present invention used for adjusting chain lengths.

DESCRIPTION OF THE PREFERRED EMBODIMENTS

Referring now to FIGS. 1 and 2, there is shown a sludge collector chain 10 of the present invention. The sludge collector chain 10 comprises a center block link 12, a first or insert sidebar 14, and a second or receiving sidebar 16, a pin 18, and a pin cap 20. The sludge collector chain 10 preferably also comprises a flight attachment link 22 for attaching a flight, not shown, as is standardly done in the industry.

The center block link 12 comprises a first bore 24 and a second bore 26. The insert sidebar 14 comprises a first bore 28 and a second bore 30, extensions 32 surrounding the bores 28, 30, and a central portion 34 between the extensions 32. The receiving sidebar 16 comprises a first bore 36, a second bore 38, extensions 40 surrounding the bores 36, 38, and a central portion 42 between the extensions 40. The flight attachment link 22 also comprises a first bore 44, a second bore 46 and a flight attachment portion 48 having a plurality of bores 50 for attaching a flight, not shown.

Referring also to FIG. 3, there is shown the pin 18 of the present invention. The pin 18 comprises a first end portion 52, a second end portion 54, and a central portion 56 between the end portions 52 and 54.

Referring also to FIGS. 5 and 6, the first end portion 52 comprises a head section 58 and a raised knob 60. Preferably, the diameter of the head section 58 is larger than the diameter of the central portion 56 in order to allow the pin 18 to properly secure the insert sidebar 14 in relation to either the center block link 12 or the flight attachment link 22. The raised knob 60 is used to assist in pin rotation during assembly of the pin 18 into the chain link bores. Preferably, the head section 58 has two linear surfaces 57 and 59 and two curved surfaces 61 and 63.

Referring now to FIGS. 3 and 4, the second end portion 54 comprises a first section 62, a second section 64, and a grooved section 66 disposed between the first and second sections. The grooved section 66 is smaller in cross-section than the first section 62 and the second section 64. Preferably, the first section 62, the second section 64, and grooved section 66 are circular in cross-section and each have a cross-section which is smaller in diameter than the cross-section of the central portion 56 of the pin 18. Preferably, the second end portion further comprises a cavity 68 which is centrally disposed about the axis 69 of the pin 18 and is disposed through the second end portion 54.

A second cavity 70 extends from cavity 68 and is disposed within the central portion 56 of the pin 18. Preferably, the cavity 70 is centrally disposed about the axis 69 of the pin and is smaller in cross-section than cavity 68. In a preferred embodiment, the central portion 56 is slightly larger in diameter at its ends 72, 74 by 0.013 inches than the portion 75 between the ends 72, 74 in order to create relatively tight assembly joints of the sidebars 14, 16 and relatively loose joints at the center block link 12 to allow ease of joint articulation in use.

Referring now to FIGS. 3 through 7, a representative example of the dimensions of the pin 18 will be described. The pin 18 may have a dimension 76 from the tip of the head section 58 to the end of the pin of 3.522 inches, a dimension 80 of 0.250 inches for the head section 58 length, and a dimension 78 of 0.375 inches for the raised knob 60 length. Further, the length 82 of the end 72 may be 0.480 inches, the length 84 of the end 74 may be 0.448 inches, and the length 86 of portion 75 may be 1.970 inches. The diameter 88 of end 72 may be 0.959 inches, the diameter 90 of end 74 may be 0.959 inches, and the diameter 92 of portion 75 may be 0.946 inches.

The second end portion 54 may have a diameter 94 of 0.866 inches for the first section 62, a diameter 96 of 0.851 inches for the second section 64, and a diameter 98 of 0.788 inches representing the minimum diameter of the grooved section 66. The first section 62 may have a length 100 of 0.125 inches, the second section 64 may have a length 102 of 0.155 inches, and the grooved section 66 may have a length 104 of 0.094 inches. On side of the first section 62 may have a radius of curvature 106 of 0.031 inches and the grooved section 66 preferably has a radius of curvature 108 of 0.031 inches. The second section 64 may also comprise a chamfer 110 of 0.03125 inches by forty-five degrees. The cavity 68 may have a diameter 112 of 0.500 inches and a depth of 0.375 inches and the cavity 70 may have a diameter 114 of 0.310 inches and a depth of 2.75 inches.

As shown in FIGS. 3, 5, and 6, the raised knob 60 may have a dimension 116 of 1.0 inches, a dimension 118 of 0.75 inches, and a dimension 120 of 0.25 inches. Further, the first end portion 52 may have a dimension 122 of 1.123 inches and a dimension 124 of 1.500 inches. Preferably, the first end portion 52 has a radius of curvature 126 and 128 of 0.125 inches, a radius of curvature 130 and 132 of 0.0625 inches, and a radius of curvature 134 of 0.03125 inches. Further, preferably, the head section 58 has a chamfer 136 of 0.09375 inches by forty-five degrees.

Now referring to FIGS. 7, 8, and 9, there is shown the pin cap 20 of the present invention. The cap 20 comprises a cover 150 having an interior bore 152 and a sleeve 154. Preferably, the sleeve 154 comprises a plurality of equally spaced slits 156. In the embodiment shown, there are four slits 156. Further, preferably the sleeve 154 comprises a non-continuous ring 158 having a raised ring protuberance 160 thereon, the ring being non-continuous in the location of the slits 156. The raised ring protuberance 160 is preferably disposed around the ring 158 circumference. The cap 20 may have two curved surfaces 162 and 164 and two linear surfaces 166 and 168. The cap 20 is sized such that if fits in a snap-lock fashion around the pin 18. As a result, the raised ring protuberance 160 of the cap 20 may be snap-lock fit around the grooved section 66 of the pin 18.

The cap 20 may, for example, have a total length 170 of 0.438 inches and a cover length 172 of 0.094 inches. The diameter 174 of the bore 152 may be 0.562 inches and the length 176 between linear surfaces 166 and 168 of 1.063 inches. The distance 178 between the most outward points of the raised ring protuberance 160 may be 0.804 inches the distance 180 between the bases of the raised ring protuberance may be 0.876 inches. Further, the width 182 of the raised ring protuberance 160 may be 0.072 inches and the length 184 from the edge of the cap 20 to the raised ring protuberance 160 may be 0.089 inches. The slit 156 may have a length 186 of 0.224 inches and may have a width 188 0.063 inches. Further, the length 190 from the edge of the cap 20 to the edge of the cover 150 may be 0.344 inches. The diameter between the curved surfaces 162, 164 may be 1.500 inches.

In order to assemble the chain 10, the center block links 12 are alternatively placed in relation to the insert sidebar 14 and receiving sidebar 16 as best shown in FIGS. 1 and 2. Further, pin 18 may be placed though bore 28 of the insert sidebar 14, through bore 26 of the center block link 12, and through bore 36 of the receiving sidebar 16. Moreover, the pin cap 20 may be secured around the second end portion 54 of the pin 18, shown in FIGS. 3 and 4. Specifically, raised ring protuberance 160 on the pin cap 20 is secured in a snap-fit fashion into grooved section 66 of the pin 18. The pin cap 20 may, for example, be snap-fit into the pin 18 via the use of a hammer against the cover 150 of the pin cap 20.

Similarly, another pin 18 may be secured through bore 30 of the insert sidebar 14, through bore 24 of the center block link 12, and through bore 38 of the receiving sidebar 16. As before, the pin cap 20 may be secured to the pin 18 with the aid of a hammer, the raised ring protuberance 160 of the pin cap 20 being snap-fit into the grooved section 66 of the pin 18. Therefore, sidebars 14 and 16 may be secured in alternating relationship with the center block link 12.

The flight attachment link 22 may also be similarly connected to the sidebars 14 and 16 by the use of a pin 18. Specifically, a pin 18 may be secured through bore 30 in the insert sidebar 14, through bore 44 of the flight attachment link 22, and through bore 38 of the receiving sidebar 16. As before, the pin cap 20 may be snap-fit about the end of the pin 18. Therefore, instead of placing the center block link 12 between a pair of sidebars 14 and 16, the flight attachment link 22 may be inserted in its place when it is desired to have a flight connected to the chain link.

As stated above, preferably the head section 58 of the pin 18, has two linear surfaces 57 and 59 and two curved surfaces 61 and 63. Further, preferably the cap 20 has two curved surfaces 162 and 164 and two linear surfaces 166 and 168. The respective insert sidebar 14 and receiving sidebar 16 may have slots with corresponding complimentary linear and curved surfaces in order to prevent both the pin 18 and the pin cap 20 from rotating in the insert sidebar 14 or receiving sidebar 16 and only allowing the center block link 12 to articulate around the fixed pin 18.

Now referring to FIG. 10, there is shown an alternate embodiment for a sludge collector chain 10' of the present invention. The chain 10' is similar to the sludge collector chain 10 of the first embodiment except there is an optional offset coupler link 200 disposed between the center block link 12 and a pair of sidebars 14, 16. Similar components have been labeled similarly for purposes of clarity.

The coupler links 200 comprise a waist 202, two legs 204, 206, and corresponding feet 208, 210. The waist 202 has a bore 212 disposed therein for receiving a pin 18. The feet 208 and 210 each have bores 222 and 224 for receiving another pin 18. The waist 202 comprises two indentations 214, 216 on an exterior side of the offset coupler link 200. Further, each of the feet 208, 210 comprise two indentations 218, 220 on an interior side of the offset coupler link 200. Indentations 214 and 216 are sized such that they may mate with the corresponding extensions 32 and 40 of the sidebars 14, 16. Moreover, the indentations 218 and 220 are sized such that they may mate with the ends of the center block link 12.

As a result, the chain 10' of the second embodiment may comprise links in the order of first a center block link 12, then a coupler link 200, and then a pair of sidebar 14, 16 links. The pattern of the links could then be repeated in this order. When it is desired to connect a flight attachment link 22, then one side of the flight attachment link 22 may, for example, be connected to a pair of sidebars 14, 16. The other end of the flight attachment link 22 may be connected to the feet of 208, 210 of the coupler link 200. Alternately, the offset coupler links 200 may be used for adjusting the overall conveyor chain 10 of the first embodiment by removing two pitches and installing one pitch in its place.

As with the chain 10 of the first embodiment, the pin 18 and pin cap 20 may be used to secure the respective links. As a result, a pin 18 may be inserted through bore 222 of foot 208 of the offset coupler link 200, through bore 24 of the center block link 12, and through bore 224 of foot 210 of the offset coupler link 200. Pin 18 and cap 20 would secure these elements together using the same snap-fit locking action. Similarly, an additional pin 18 may be inserted through bore 28 in the insert sidebar 14, through bore 212 in the offset coupler link 200, and through bore 38 in the receiving sidebar 16 for securing these elements together in the snap-fit locking action. Moreover, pins 18 and corresponding caps 20 may be used to secure the flight attachment link 22 to the pair of sidebars 14, 16 at one end and to the coupler link 200 at the other end.

The center block links 12, the sidebars 14, 16, and the flight attachment links 22 may, for example, have a chain pitch of six inches. Similarly, the offset coupler link 200 may, for example, have a chain pitch of six inches. Further, the flight attachment links 22 may, for example, be spaced every five or ten feet, as is standardly done in the industry.

The center block links 12, the sidebars 14, 16, the pins 18, the pin caps 20, the offset coupler links 200, and fight attachments 22 may be formed of a non-metallic material such as glass reinforced polyester resin. Preferably, the chain 10 is formed of thirty percent glass fiber reinforced, lubricated, thermoplastic polyester resin having the following properties:

| Properties | Test Method ASTM | Values | Units |
| --- | --- | --- | --- |
| Reinforcement Content | | 30 | % |
| Specific Gravity/Density | D-792 | 99.22 | lb/ft$^3$ |
| Mold Shrinkage | D-955 | 0.002 | in/in |
| Hardness (test) | D-795 | R-121 | |
| Water Absorption, 24 hrs | D-570 | 0.06 | % |
| Tensile Strength | D-639 | 18000 | psi |
| Tensile Elongation | D-638 | 3 | % |
| Flexural Strength | D-790 | 28500 | psi |
| Flexural Modulus | D-790 | 12.6 | psiX10$^5$ |
| Izod Impact (notched) | D-256 | 1.80 | ft-lb/in |
| Izod Impact (unnotched) | D-4812 | 14.50 | ft-lb/in |

It should be recognized that, while the present invention has been described in relation to the preferred embodiments thereof, those skilled in the art may develop a wide variation of structural details without departing from the principles of the invention. Therefore, the appended claims are to be construed to cover all equivalents falling within the true scope and spirit of the invention.

What is claimed is:

1. A sludge collector chain comprising:

at least one center block link comprising a first bore at a first end of said center block link and a second bore at a second end of said center block link;

at least one insert sidebar comprising a first bore at a first end of said insert sidebar and a second bore at a second end of said insert sidebar;

at least one receiving sidebar comprising a first bore at a first end of said receiving sidebar and a second bore at a second end of said receiving sidebar;

a pin comprising a first end portion, a second end portion, and a central portion disposed between said first and second end portions, said second end portion having a grooved section, said pin being positioned through said first bore of said insert sidebar, through said first bore of said center block link, and through said first bore of said receiving sidebar; and a pin cap comprising a sleeve having a raised ring protuberance thereon, said raised ring protuberance being in snapped-fit relation to said grooved section of said pin.

2. The invention of claim 1 wherein said chain comprises a plurality of said center block links and a plurality of said insert sidebars and receiving sidebars, said center block links being in alternating relationship with respect to said insert sidebars and said receiving sidebars and wherein a plurality of said pins are disposed in respective bores in said center block links, said insert sidebars, and said receiving sidebars and a plurality of said pin caps are disposed about said second end portion of said pins.

3. The invention of claim 1 further comprising a flight attachment link having a bore at each end, said flight attachment link being connected to said at least one receiving sidebar and said at least one insert sidebar wherein said pin is positioned through said second bore of said insert sidebar, through one of said bores of said flight attachment link, and through said second bore of said receiving sidebar.

4. The invention of claim 1 wherein said grooved section of said pin is circular in cross section.

5. The invention of claim 1 wherein said pin comprises a first cavity and a second cavity, said first cavity being disposed in said second end portion of said pin and said second cavity being disposed in said central portion of said pin, said second cavity being smaller in cross section than said first cavity.

6. The invention of claim 1 wherein said pin cap comprises at least one slit.

7. The invention of claim 6 wherein said pin cap comprises a plurality of equally spaced slits.

8. The invention of claim 1 further comprising a offset coupler link, said offset coupler link being disposed between said center block link and said insert and receiving side bars.

9. The invention of claim 1 wherein said chain is non-metallic.

10. A sludge collector chain comprising:
- at least one center block link comprising a first bore at a first end of said center block link and a second bore at a second end of said center block link;
- at least one insert sidebar comprising a first bore at a first end of said insert sidebar and a second bore at a second end of said insert sidebar;
- at least one receiving sidebar comprising a first bore at a first end of said receiving sidebar and a second bore at a second end of said receiving sidebar;
- at least one offset coupler link, said offset coupler link comprising a waist, two legs extending from said waist, and two feet extending from said two legs, said offset coupler link further comprising a first bore in said waist and a second bore extending through both of said two feet, said offset coupler link being disposed between said at least one center block link and both of said at least one insert sidebar and said at least one receiving sidebar;
- at least two pins, each of said pins comprising a first end portion, a second end portion, and a central portion disposed between said first and second end portions, said second end portion having a grooved section, a first pin being positioned through said first bore of said center block link and through said second bore in said offset coupler link extending through both of said two feet and a second pin being positioned through said first bore in said offset coupler link extending through said waist, through said first bore in said insert sidebar, and through said first bore of said receiving sidebar; and
- at least two pin caps, each of said pin caps comprising a sleeve having a raised ring protuberance thereon, said raised ring protuberance of each of said pin caps being in snapped-fit relation to each of said grooved sections of said pin.

11. The invention of claim 10 wherein said chain comprises a repeating pattern of said center block links, said coupler links, and said insert sidebars and receiving sidebars, and wherein a plurality of said pins are disposed in respective bores in said center block links, said coupler links, said insert sidebars, and said receiving sidebars and a plurality of said pin caps are disposed about said second end portion of said pins.

12. The invention of claim 10 wherein said grooved section of said pin is circular in cross section.

13. The invention of claim 10 wherein said pin comprises a first cavity and a second cavity, said first cavity being disposed in said second end portion of said pin and said second cavity being disposed in said central portion of said pin, said second cavity being smaller in cross section than said first cavity.

14. The invention of claim 10 wherein said pin cap comprises at least one slit.

15. The invention of claim 14 wherein said pin cap comprises a plurality of equally spaced slits.

16. The invention of claim 10 wherein said chain is non-metallic.

* * * * *